United States Patent [19]

Glantz et al.

[11] Patent Number: 4,559,232

[45] Date of Patent: * Dec. 17, 1985

[54] PROCESS FOR MAKING PARTICLE EMBEDDED FOOD PRODUCTS

[75] Inventors: Jerome J. Glantz, Tualatin; Michael G. Doenges, Newberg, both of Oreg.

[73] Assignee: Lamb-Weston, Inc., Portland, Oreg.

[*] Notice: The portion of the term of this patent subsequent to Jun. 26, 2001 has been disclaimed.

[21] Appl. No.: 622,788

[22] Filed: Jun. 21, 1984

Related U.S. Application Data

[63] Continuation-in-part of Ser. No. 457,911, Jan. 14, 1983, Pat. No. 4,456,624.

[51] Int. Cl.$^4$ .................... A23L 1/212; A23L 1/216
[52] U.S. Cl. ........................ 426/96; 426/102; 426/295; 426/615; 426/637
[58] Field of Search ............... 426/96, 102, 273, 295, 426/438, 637, 281, 808, 615

[56] References Cited

U.S. PATENT DOCUMENTS

| | | | |
|---|---|---|---|
| 1,985,238 | 12/1934 | Brogden | 426/295 |
| 2,056,884 | 10/1936 | Brunstetter | 426/637 |
| 2,441,305 | 5/1948 | Wilson | 426/287 |
| 2,893,332 | 7/1959 | Roser et al. | 426/295 X |
| 2,967,493 | 1/1961 | Cloud et al. | 426/295 |
| 3,306,751 | 2/1967 | Appleby | 426/295 |
| 3,363,586 | 1/1968 | Jernigan et al. | 426/295 |
| 3,397,993 | 8/1968 | Strong | 426/637 X |
| 3,427,951 | 2/1969 | Mitan et al. | 426/302 |
| 3,607,313 | 9/1971 | Roth | 426/302 |
| 3,649,305 | 3/1972 | Wilder | 426/637 X |
| 3,743,512 | 7/1973 | Hansen | 426/96 |
| 3,767,826 | 10/1973 | Frum | 426/293 |
| 3,865,964 | 2/1975 | Kellermeier et al. | 426/438 X |
| 3,949,096 | 4/1976 | Johnson et al. | 426/302 |
| 4,186,216 | 1/1980 | Roth | 426/519 X |
| 4,208,435 | 6/1980 | Wood | 426/92 |
| 4,246,293 | 1/1981 | Larson | 426/637 |
| 4,254,153 | 3/1981 | Ross et al. | 426/637 X |
| 4,256,777 | 3/1981 | Weaver et al. | 426/637 |
| 4,277,510 | 7/1981 | Wicklund et al. | 426/441 |
| 4,297,377 | 10/1981 | Harney et al. | 426/438 |
| 4,298,627 | 11/1981 | Rains | 426/637 |
| 4,456,624 | 6/1984 | Glantz et al. | 426/637 X |

FOREIGN PATENT DOCUMENTS 0026505 4/1981 European Pat. Off. ............ 426/637

*Primary Examiner*—Arthur L. Corbin
*Attorney, Agent, or Firm*—Klarquist, Sparkman, Campbell, Leigh & Whinston

[57] ABSTRACT

A method of preparing a food product includes cutting the food product into pieces, preheating at least one of the pieces to soften its outer surface, and impinging a stream of food particles carried in air against the piece at a velocity sufficient to embed the particles in the outer surface layer of the piece by disrupting the outer surface tissue without destroying the structural integrity of the piece. The particle-impacted piece is dried, blanched, parfried and frozen. When reconstituted, the product has a firm, crisp outer surface and improved texture in comparison to a product without embedded food particles.

13 Claims, 1 Drawing Figure

PROCESS FOR MAKING PARTICLE EMBEDDED FOOD PRODUCTS

This application is a continuation-in-part of application Ser. No. 457,911, filed Jan. 14, 1983, now U.S. Pat. No. 4,456,624.

The present invention relates generally to food processing, and more particularly to a method for applying a particulate media to the outer surface of a food product, especially a french fried potato strip.

BACKGROUND OF THE INVENTION

Frozen french fried potato strips are typically prepared by washing, peeling and cutting into strips whole potatoes and then blanching, parfrying and freezing the strips. Heretofore, attempts have been made without much success to deposit on outer surfaces of such strips a relatively dry particulate media, such as starch, seasonings, flavor particulates or the like, thereby to enhance the flavor and texture of the product, or to create an altogether different tasting product. Such attempts have also been intended to improve the coloration of the product and to reduce its oil perception (content) when reconstituted by frying.

For example, potato strips have been dusted with a media after blanching. However, the media does not adhere well to the strips, and consequently most of the media falls off during further processing, typically during parfrying. As a subsidiary problem, the loose media contaminates the fryer.

More generally, bread crumbs have been applied commercially to food products after dipping the product in a batter to which the crumbs adhere. See, for example, Wood U.S. Pat. Nos. 4,208,435 and Frum 3,767,826. However, the heavy, batter-fried taste characteristic of such a product is not desirable for french fried potato strips and may not be desirable for other food products as well.

Aqueous coatings have also been applied to food products using well known spray, slurry and enrobing techniques. For example, Roth U.S. Pat. No. 3,607,313 shows a method of coating quick-frozen, discrete food pieces by spraying them with a sauce-like liquid in a tumbling drum. And, Mitan et al, U.S. Pat. No. 3,427,951 shows a process in which a starch base slurry is used to dip or spray a food product to give it a protective film. However, such techniques inherently are not suitable for applying a relatively dry particulate media to the outer surface of a food product.

Accordingly, there is a need for a process for applying a relatively dry particulate media to the outer surface of a food product, particularly a french fried potato strip, such that the media is substantially retained on the product during processing and gives it an improved character.

It is therefore an important object of the invention to provide a process for applying a particulate media to the outer surface of a food product, such as a french-fried potato strip, such that the media is substantially retained on the product after processing.

A second important object of the invention is to provide a process as aforesaid in which french fried potato strips and other food products processed thereby have improved characteristics.

A more specific object of the invention is to provide a process as aforesaid in which potato strips processed thereby have a crisper, more palatable surface texture than prior potato strips.

A further object of invention is to provide a process as aforesaid in which potato strips processed thereby have an enhanced flavor.

Another object of the invention is to provide a process as aforesaid in which potato strips processed thereby have a lower oil perception than prior strips.

Still another object of the invention is to provide a process as aforesaid which causes minimal contamination to the fryer during parfrying or reconstitution.

Other objects and advantages of the invention will become apparent from the drawings and following detailed description.

SUMMARY OF THE INVENTION

In accordance with the foregoing objects, the present invention comprises a process for preparing a food product with an embedded particulate media. A food product selected from the class of vegetables and fruits, such as potatoes, apples, squash or zucchini, is cut into pieces. The pieces are impinged with food particles carried in a fluid stream at a velocity sufficient to embed the particles in an outer surface of the pieces by disrupting the outer surface tissue without destroying the structural integrity of the pieces. Prior to impinging, the pieces are preferably preheated in water and chemically treated in a flume. The particle-impacted pieces are preferably partially dried, steam-blanched, parfried in oil and frozen. The frozen pieces are reconstituted, such as by baking or frying in oil. The resulting product has an appreciably crisper outer surface and lower oil content than similarly processed pieces without an embedded media.

DETAILED DESCRIPTION OF A PREFERRED EMBODIMENT

Process and Product

Figure 1:
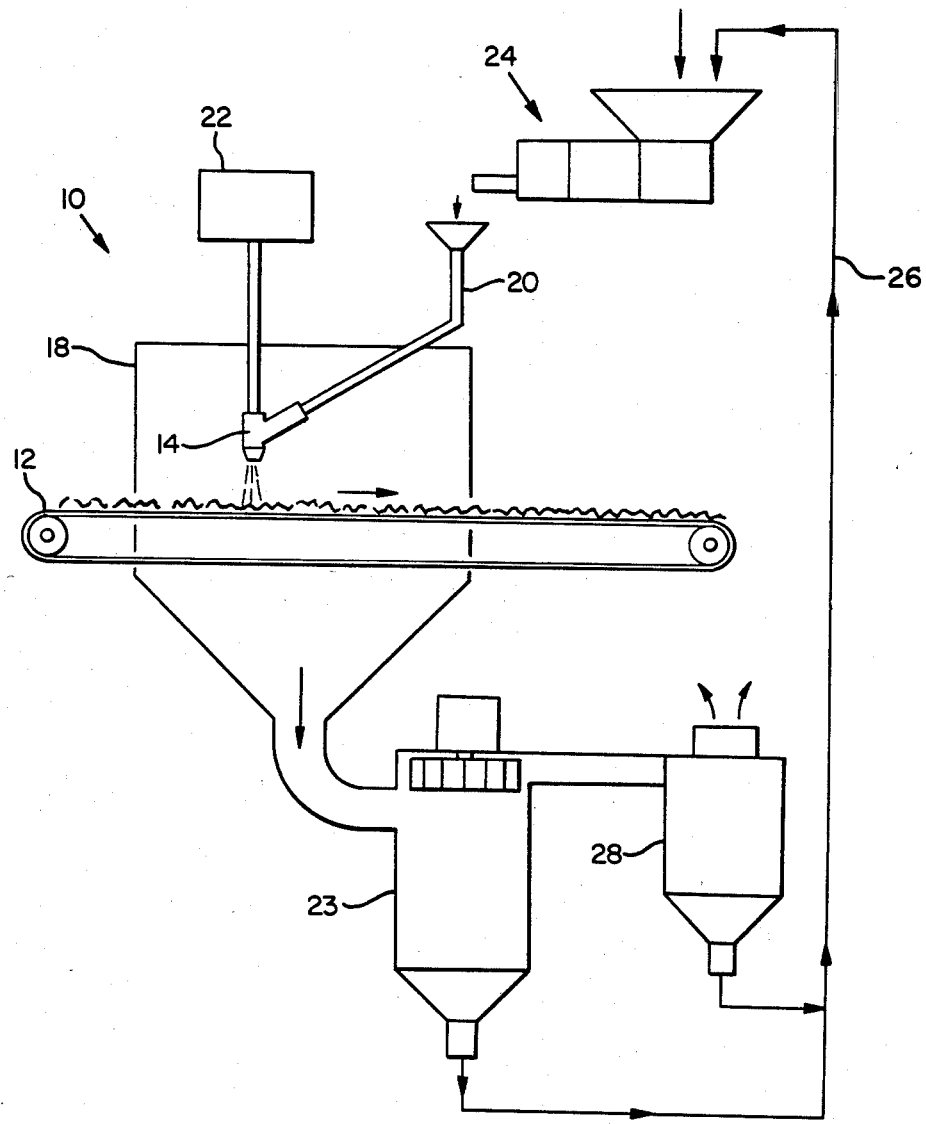
FIG. 1 is a schematic view of a particle impinging apparatus in accordance with the present invention.

In accordance with one application of the present invention, potatoes are held in storage under conventional accepted conditions, so as not to accumulate excessive amounts of sugar therein. Potatoes of the Russet-Burbank variety are preferred. The potatoes are cleaned with a water flume or spray, and then peeled in a conventional manner, using steam or a caustic solution. The potatoes are cut into sections suitably sized for french fried potato strips.

The strips are next preheated, either in water at a temperature within the range of about 150° F. to 190° F. or steam at a temperature within the range of about 190° F. to 220° F. for about 1–15 minutes. Preferably, the preheating is carried out in water at about 155° F. for about 5 minutes, to leach the natural sugars therein and to condition the strips. Such conditioning includes softening and moistening the strip surfaces. The preheated strips are treated in a flume containing about 0.75% sodium acid pyrophosphate (SAPP), a preservative and color brightener. Other preservatives, such as $SO_2$, HCl, or coloring agents, such as dextrose, may be added to the flume or substituted for the SAPP in a known manner. The strips are dipped for about 10–60 seconds in the flume, and preferably for about 20 seconds.

As illustrated by FIG. 1, a bed of treated strips are thereafter passed on a conveyor screen under a blasting nozzle, and a high velocity stream of particles is impinged upon the strips. The particles, preferably having a size of about 80-100 mesh, embed in outer surfaces of the strips. Particles comprising about 100 percent potato granules, such as those sold by Basic American Potato Company, Moses Lake, Wash., work well. Other particulate media, including potato flakes, potato flour, potato granules with nacho cheese seasoning, potato granules with tallow flavoring, or a mix of potato granules and starch, may also be used.

The potato granules are impacted against the bed of strips for about 5 to 20 seconds, and preferably for about 10 seconds, causing the strips to undergo a weight gain of about 4%. The impinging velocity of the granules must be large enough to embed or impregnate the granules in the outer cellular surface layers of the strips, but not so great as to destroy the structural integrity of the strips. The exit velocity of the granules as they leave the nozzle is believed to be within the range of 550 ft/sec to 750 ft/sec, and has been roughly calculated to be about 650 ft/sec. It is not known, however, whether the actual impact velocity of the granules is less or greater than the exit velocity. The high velocity of the air stream associated with the granules agitates the bed such that no one strip is subject to the impinging granules for the full 10 seconds.

The granule-impacted strips are partially dried in a dryer at a temperature within the range of about 150° F. to 250° F. to cause an estimated 10-30% moisture weight loss in the strips. Drying at about 200° F. for a time sufficient to cause a 20% moisture weight loss is preferred. Thereafter, the strips are steam blanched at a temperature within the range of about 190° F.-220° F. for about 2-10 minutes, and preferably at about 200° F. for about 2 minutes.

The blanched strips are then parfried in hot oil at a temperature within the range of about 340° F. to 380° F. for about 5-120 seconds, and preferably at about 370° F. for about 15 seconds. If prepared according to the foregoing parameters, the parfried strips will have a solids content of about 34-37%, including about 5-10% oils (typically about 7-8% oils). For purposes of storage and/or shipment, the strips are frozen in a conventional manner.

The frozen potato strips are reconstituted by frying them in oil at a temperature of about 350° F. for about 2½ minutes, or by other conventional methods, such as baking or heating in a microwave oven.

The embedded potato granules give the strips an unusually high solids content at their outer surfaces, thereby causing the strips to have a crisper, more palatable surface texture than prior strips and an enhanced flavor upon reconstitution.

The solids content of potato strips increases during frying through the absorption of oil and the loss of moisture from the strips. As the oil content increases due to the absorption of oil, the oil perception by the consumer also ordinarily increases. It is undesirable to have a perception of high oil content. However, strips prepared in accordance with the invention advantageously exhibit a relatively low oil content and therefore a low oil perception and less greasy character than prior products. This is due in part to the embedded potato granules which seem to act as a partial barrier to the oil during parfrying, and also refrying. It is also due to a relatively short parfrying time. A longer, more conventional parfry is not necessary because the strips have a relatively high solids content even before parfrying, by reason of the addition of the potato granules to the surface, and hence attain the commonly preferred solids content of about 34-37% during the foreshortened parfry, as moisture is lost during parfrying.

Yet another advantage of such potato strips is that they retain their crispness longer after refry than conventionally prepared strips.

Potato granule-impacted potato strips are similar in appearance to conventional potato strips, although they "puff up" slightly during parfrying and have a slightly rougher surface texture. Electron micrographs of the strips show disruption of the outer cellular tissue with a fairly uniform embedding of potato granules therein. A particulate media applied in this way is not likely to fall off during processing.

Impinging Apparatus

Referring again to FIG. 1, a particle impinging apparatus 10 includes a conveyor 12 upon which a bed of potato strips are transported beneath the flow path of a nozzle 14 encased in a housing 18. Nozzle 14, which receives potato granules from a feed line 20, is driven by an air compressor 22.

Loose potato granules which do not embed in the strips fall to the bottom of housing 10, where they are recycled by a cyclone 23 to a media feeding means 24 through a line 26. Similarly, fines from cyclone 23 are filtered in a bag house 28 and returned to feeding means 24. In this way, undeposited granules are continuously recycled and thereby conserved.

EXAMPLE I

Russet-type potatoes were washed, peeled and cut into strips, yielding about 5 lbs. of product. The strips were conditioned slightly by preheating them in water at a temperature of about 155° F. for about 5 minutes, and then dipped for about 20 seconds in a flume containing about 0.75% SAPP. The strips were next subjected to a high velocity stream of potato granules carried in air.

The granules had a size of about 80-100 mesh and were obtained from Basic American Potato Company. A standard handgun or blasting nozzle manufactured by Zero Manufacturing Company, Washington, Mo., model number BNP55-7, was used. It had a #5 orifice (5/32 inch diameter opening) and a #5 nozzle (5/16 inch diameter opening). A stream flow rate of about 35 CFM at about 85 psi was used, yielding a roughly estimated nozzle exit velocity for the granules of about 650 feet per second. The nozzle was positioned about 12 inches from the stips which were exposed to the stream for about 10 seconds. The potato granules embedded in outer surfaces of the strips. The stream agitated the product to expose all the strips during that time.

The granule-impacted strips were then partially dried at a temperature of about 200° F. until they underwent a moisture weight loss of about 20%. The strips were steam blanched at a temperature of about 200° F. for about 2 minutes, parfried at a temperature of about 370° F. for about 15 seconds, and frozen at a temperature of about −10° F.

The frozen strips were reconstituted by frying them in oil at a temperature of about 350° F. for about 2½ minutes. The resulting strips had crisp, golden outer surfaces, fluffy potato interiors, enhanced flavor and relatively low oil perception. They had an average solids content of about 54.7%, including about 12.8% oils, as compared to a solids content after parfrying of about 35.4%, including about 7.2% oils. A control sample processed in a similar manner, but without the impinging step, had increased oil content of about 8.5% and 15.5% after parfrying and refrying, respectively.

EXAMPLE II

Potato strips were processed in the above manner, except that they were reconstituted by baking in an oven at a temperature of about 425° F. for about 10 minutes. The resulting strips had a relatively crisp outer surface, mealy potato interior, enhanced flavor and golden coloration.

EXAMPLE III

Skin-on "steak cut" potato pieces having a wedge (crescent) shape and a maximum thickness of about ¾ inch, and skin-on "natural slice" potato pieces having an oval/round shape and thickness of about ⅜ inch, were processed in the manner described in Example I, except where indicated. Because of the "thicker" nature of these products, they were preheated at a higher temperature and for a longer period of time than the strips of Example I. The steak cut pieces were preheated at about 180° F. for about 13 minutes. The natural slice pieces were preheated at about 180° F. for about 15 minutes.

The preheated pieces were dipped in a flume containing about 0.75% SAPP and subject to an impinging stream of potato granules for about 10 seconds at a stream flow rate of about 80 psi. The potato granules embedded in the outer cellular surface layers of the strips. The granule impacted pieces were then partially dried at a temperature of about 210° F. until they underwent a moisture weight loss of about 5%. The pieces were steam blanched for about 3 minutes, parfried in oil at a temperature of about 370° F. for about 65 seconds and frozen.

The frozen pieces were reconstituted by frying in oil at a temperature of about 360° F. for about 3½ to 4 minutes. The granules remained embedded in the outer surface layers of the pieces. The resulting pieces had crisp, uniformly golden outer surfaces and fluffy potato interiors. They had a crisper surface texture than control pieces prepared in the same way, except without the impinging step and with a slightly longer parfry.

It will be apparent to those skilled in the art that the described process can be used with other than potato-type products, including fruits and vegetables, although the required impinging velocity of the media may vary depending upon the outer cellular strength of the particular product. Other applications of the present invention are provided by the following examples.

EXAMPLE IV

Jicama were washed, peeled and cut into ¼ inch strips. The strips were preheated at a temperature of about 160° F. for about 5 minutes and dipped in a flume containing 0.75% SAPP. The strips were subject to an impinging stream of potato granules in the manner described in Example III. The granule-impacted strips were partially dried at a temperature of about 210° F. to cause a moisture weight loss of about 20%. They were then steam blanched for about 3 minutes, parfried for about 20 seconds at a temperature of about 370° F. and then frozen. The frozen strips were reconstituted by frying in oil at a temperature of about 360° F. for about 1¼ minutes. The resulting product had a firm, crisp surface. The granules remained embedded in the outer surface layers of the strips throughout the process. The product maintained a firm, crisp outer surface when the process was repeated without the parfrying step. Control product processed without the impinging step was limp and greasy.

EXAMPLE V

Peeled rutabaga cut into ½ inch strips, peeled turnips cut into ½ inch strips, peeled beets cut into ½ inch strips, peeled yams cut into 9/32 inch slices (rounds), carrots cut into 9/32 inch slices, and parsnips cut into ¼ inch strips were all processed in the manner described in Example IV, except that the beet and carrot pieces were reconstituted by frying in oil for about 1 minute (at 360° F.). In comparison to control products processed without the impinging step, each particle-impacted product had a drier, crisper outer surface and better texture than the corresponding control product. The granules remained embedded in the outer surface layers of the products throughout the process.

EXAMPLE VI

The process of Example III was repeated for steak cut potato pieces using different impinging media, namely, substituting taco flour and wheat flour for the potato granules. Both impinging media remained embedded in the outer surface layers of the pieces, even after reconstitution. Both resulting products had a crispy surface and good texture.

EXAMPLE VII

Washed, unpeeled apples were cut into wedge-shaped pieces and dipped in a solution containing $SO_2$. The pieces were preheated at a temperature of about 160° F. for about 1 minute and dipped in a flume containing 0.75% SAPP. The pieces were then impinged with a stream of cinnamon and sugar particles carried in air in the manner described in Example III. The particle-impacted pieces were partially dried at a temperature of about 210° F. to cause a moisture weight loss of about 15% and thereafter frozen. The frozen pieces were reconstituted by baking in an oven at a temperature of about 350° F. for about 10 minutes. The resulting product had a firm texture with the impinging media embedded in its outer surface layer.

Having illustrated and described the principles involved in this invention by what is presently a preferred embodiment and several suggested alternatives, it should be apparent to those persons skilled in the art that such embodiments may be modified in arrangement and detail without departing from such principles. We claim as our invention all such modifications as come within the true spirit and scope of the invention as defined by the following claims.

We claim:

1. A method of applying a particulate media to the outer surface of a potato product, the method comprising the steps of:
   preheating the product at least slightly to soften its outer surface; and then
   impinging food particles carried in a fluid stream against the product at a velocity sufficient to embed the particles in an outer surface layer of the product by disrupting the outer surface layer without destroying the structural integrity of the product.

2. A method of applying a particulate media to the outer surface of a food product which is softenable upon an increase in temperature thereof and selected from the class consisting of vegetables and fruits, the method comprising the steps of:
  preheating the product at least slightly to soften its outer surface; and then
  impinging potato particles carried in a fluid stream against the product at a velocity sufficient to embed the particles in an outer surface layer of the product by disrupting the outer surface layer without destroying the structural integrity of the product.

3. The method of claim 2 wherein the food product is a potato product.

4. The method of claim 1 wherein the particles impinged upon the product have a velocity within the range of about 550 to 750 feet per second when the particles are about twelve inches from the product.

5. The method of claim 1 wherein the product is partially dried subsequent to impinging.

6. The product prepared in accordance with the method of claim 1.

7. A method of applying a particulate media to the outer surface of a food product which is softenable upon an increase in temperature thereof and selected from the class consisting of vegetables and fruits, the method comprising the steps of:
  preheating the product at least slightly to soften its outer surface;
  impinging food particles carried in a fluid stream against the product at a velocity sufficient to embed the particles in an outer surface layer of the product by disrupting the outer surface layer without destroying the structural integrity of the product; and then
  blanching the product subsequent to said impinging.

8. A method of applying a particulate media to the outer surface of a food product which is softenable upon an increase in temperature thereof and selected from the class consisting of vegetables and fruits, the method comprising the steps of:
  preheating the product at least slightly to soften its outer surface;
  impinging food particles carried in a fluid stream against the product at a velocity sufficient to embed the particles in an outer surface layer of the product by disrupting the outer surface layer without destroying the structural integrity of the product; and then
  parfrying the product subsequent to said impinging.

9. A method of applying a particulate media to the outer surface of a food product which is softenable upon an increase in temperature thereof and selected from the class consisting of vegetables and fruits, the method comprising the steps of:
  preheating the product at least slightly to soften its outer surface;
  impinging food particles carried in a fluid stream against the product at a velocity sufficient to embed the particles in an outer surface layer of the product by disrupting the outer surface layer without destroying the structural integrity of the product;
  partially drying the product subsequent to impinging; and
  blanching and then parfrying the product subsequent to drying.

10. A method of preparing a food product selected from the class consisting of fruit and vegetables comprising the steps of:
  cutting the food product into pieces;
  impinging food particles carried in a fluid stream against at least one of the pieces at a velocity sufficient to embed the particles in an outer surface layer of the piece by disrupting the outer surface layer without destroying the structural integrity of the piece;
  preheating each piece at least slightly to soften its outer surface subsequent to cutting and prior to impinging; and
  blanching and then parfrying each piece subsequent to preheating.

11. The method of claim 10 further comprising partially drying the piece subsequent to preheating and prior to blanching.

12. The product prepared in accordance with the method of claim 11.

13. The product prepared in accordance with the method of claim 10.

* * * * *